Dec. 16, 1958 V. J. LUNDELL 2,864,223
HAY CHOPPER
Filed Oct. 21, 1955 2 Sheets-Sheet 1

INVENTOR.
Vernon J. Lundell
BY Sam J. Slotsky
ATTORNEY

Dec. 16, 1958 V. J. LUNDELL 2,864,223
HAY CHOPPER

Filed Oct. 21, 1955 2 Sheets-Sheet 2

INVENTOR.
Vernon J. Lundell
BY
Sam J. Slotsky
ATTORNEY

United States Patent Office 2,864,223
Patented Dec. 16, 1958

2,864,223

HAY CHOPPER

Vernon J. Lundell, Cherokee, Iowa

Application October 21, 1955, Serial No. 542,072

2 Claims. (Cl. 56—1)

My invention relates to a hay chopper.

An object of my invention is to provide a device which will gather hay from the field, or which will cut standing crops in the field and whereby the same device will also further chop the hay or other crop after it is gathered from the field, and to provide an arrangement in which the crop thus chopped is efficiently thrown directly into a discharge member, said discharge member having a rear terminal point through which the material can pass into a wagon or the like.

A further object of my invention is to provide such a device in which the chopping portions of the device include certain members which will efficiently gather or cut the crop material and thence impel the same quickly and directly into the discharge chute without the necessity of using other conveying apparatus and the like.

A further object of my invention is to provide a discharge member which besides passing rearwardly, also passes somewhat laterally, and which member also includes certain deflecting baffle members which will provide means wherein the discharged material will pass smoothly and uniformly through the laterally positioned discharge member.

A further object of my invention is to provide such an arrangement which can be drawn by a tractor, and can be powered therefrom.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1:
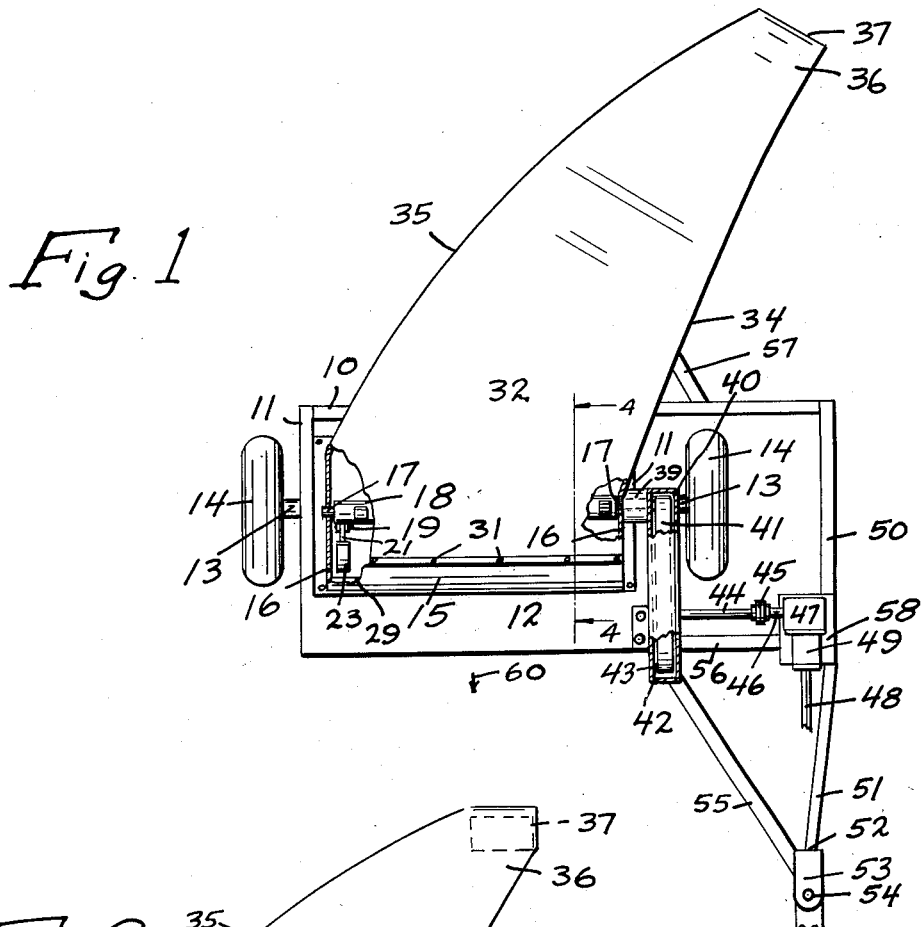
Figure 1 is a plan view of the device, portions thereof being taken in section.

My invention contemplates the provision of a hay chopper, which includes an arrangement wherein the same cutting device used to gather the crop also chops the crop and thence conveys the same directly to a discharge chute, such conveyance being performed in a manner wherein the chopped crop is directed thereto in a highly efficient manner.

I have used the character 10 to designate a transverse framework member to which are attached the framework members 11 which in turn are attached to a further transverse framework member 12.

Attached to the members 11 are the shafts 13 upon which are journalled the wheels 14, it being understood also that if desired, the wheels 14 can be mounted on adjustable members for positioning the wheels adjustably with respect to the framework.

Suitably secured to the framework members is a downwardly concave arcuate casing 15 having the end walls 16 and journalled in the end walls 16 are the transverse shaft members 17 which are rigidly secured to the ends of the cylindrical pipe member 18.

Attached at spaced intervals along the pipe member 18 are the pairs of spaced ears 19 and pivotally secured to the ears 19 by means of the bolts 20 are the hammers 21 which are welded at 22 to the transversely positioned members 23, the members 23 having the arcuate portions 24, and terminating in the beveled ends 25.

Welded at 26 to one of the lower edges of the member 15 is the transverse cutting bar 28 having the inner edge 29 which can be sharpened if such is desired.

The casing 15 includes an opening at 30 and attached about the perimeter of this opening at 31 is an angularly positioned discharge chute having the upper wall 32, the lower wall 33, side wall 34 and the curved angularly inclined further side wall 35, all of these walls merging into the reduced portion at 36 which includes a discharge opening at 37. The character 38 indicates a brace member.

Figure 4:
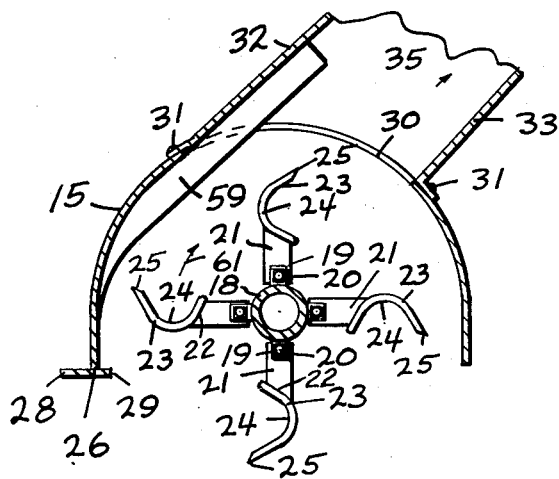
Figure 4 is an enlarged view taken in section along the lines 4—4 of Figure 1.
Figure 5:
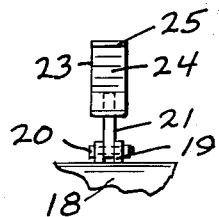
Figure 5 is a detail, of the hammers.

It will be noted from Figure 1 that the various members 23 are in staggered relation, so that each member 23 as it rotates will practically fill the space between the further members 23, there being four rows of such members as shown in Figure 4.

One of the shafts 17 passes through a housing 39, the shaft 17 being attached to a small pulley 40 over which passes a belt 41, the belt 41 passing over a larger pulley 42, these pulleys and belt being positioned within a casing 43.

Attached to the pulley 42 is a shaft 44 which is attached to the coupling 45 which in turn is attached to a further short shaft 46 which passes within the casing 47, the casing 47 including a suitable bevel gear, not shown, attached to shaft 46 adapted to be driven by a bevel gear, not shown, attached to the further shaft 48 which shaft passes through the further casing member 49, the shaft 48 being suitably connected to the power take-off shaft of the tractor, not shown, which draws the device, this arrangement thereby driving the shafts 44 and 17.

The character 50 designates a further framework portion which extends into the portion 51 which is secured at 52 to the hitching device 53 which includes the opening 54 for providing attachment to the tractor draw bar, the character 55 indicating a further bracing member, the characters 56 and 57 indicating further framework and bracing members. The casing 47, 49 rests upon a platform 58.

Figure 2:
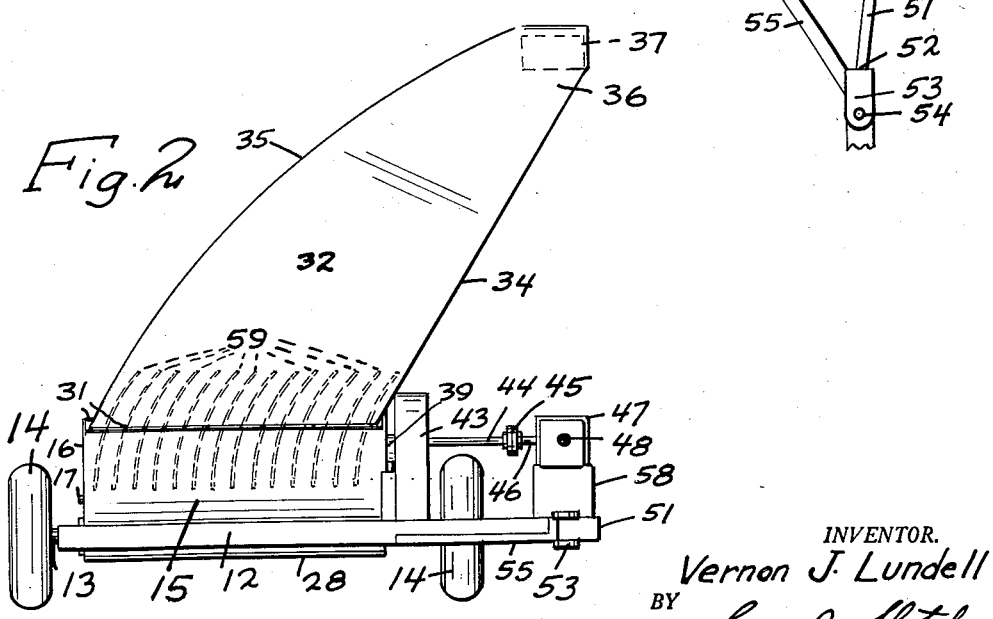
Figure 2 is a front end view of the device.
Figure 3:
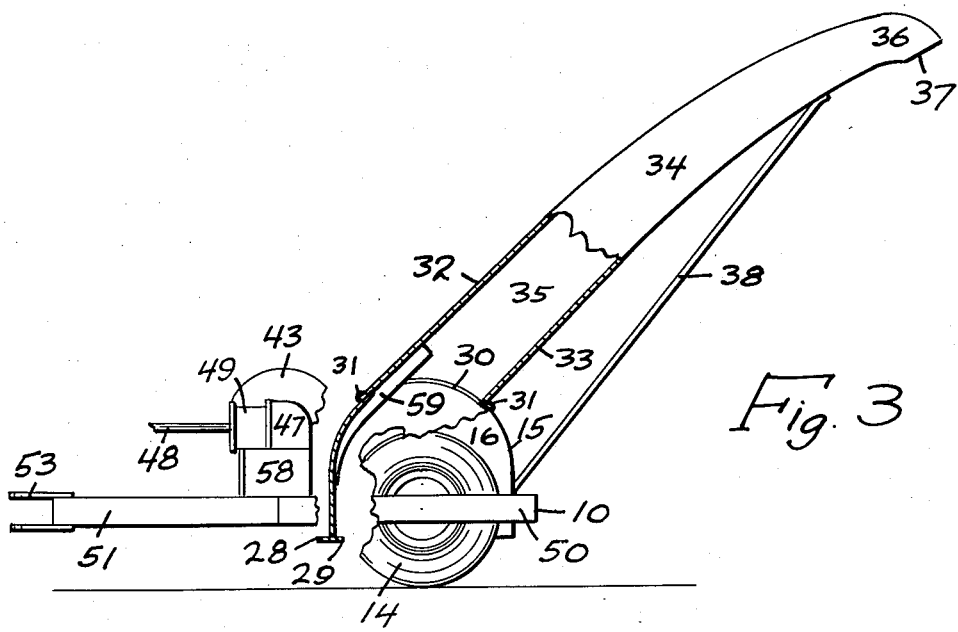
Figure 3 is a fragmentary side view of the device.

Attached to the casing wall 15, or to the wall 32 if desired, are the laterally spaced angularly inclined and curved baffle plates or flanges 59, these plates being spaced as shown clearly in Figure 2, there thus being provided a channel between each member 59.

The device is pulled along the field by the tractor in the direction of the arrow 60 as shown in Figures 1 and 4, the members 23 rotating in the direction of the arrow 61.

During such rotation the crop is either gathered or cut by the edges 25 of the members 23 at the lower points of rotation, the material being thence further chopped up as the members 23 pass the edge 29 of the bar 28, the chopped material thence being thrown directly through the opening 30 and into the chute comprising the walls 32, 33, 34 and 35, the wall 35 serving to deflect and concentrate the material toward the portion 36, the material then passing through the opening 37 into the wagon, not shown, which is towed behind the unit, it being understood that the wagon or other receptacle can be towed in any desired manner.

I have also found that by providing the baffle members 59, the material is thrown and correctly guided toward the upper opening 37 in a very uniform and positive manner, which effect is not obtained nearly as well if these baffle members are left out of the arrangement, since the channels provided between the baffles uniformly pick up and direct the material as it is chopped from each row of chopper elements 23.

It should be specifically noted also that the discharge member having the walls 32, 35 etc. is inclined rearwardly and also to one side, which is highly desired in gathering arrangements, these baffles thereby serving to correctly distribute the material as it is thrown upwardly and laterally as explained above, without undue clogging or without bunching of the material as it is discharged, and it should be understood that the baffles could be made of any desired length.

It will now be noted that the device of my invention provides the advantages mentioned with other advantages being apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A crop gathering machine comprising a semi-cylindrical casing having its concavity facing downwardly and disposed transversely of the line of travel, a framework to which said casing is secured, a rotating chopping and gathering structure journalled in said casing and substantially coaxial thereof for chopping and gathering standing crops, and including a plurality of radially positioned hammers, an upper discharge chute communicating directly through an upper portion of said casing, the lower end of said chute being substantially co-extensive with said casing, said chute including a plurality of laterally spaced baffle members therein for uniformly discharging material between said baffle members, said baffle members being positioned substantially vertically and generally following the contour of the wall of said casing, said baffle members extending upwardly into said chute and along a wall thereof.

2. A crop gathering machine comprising a semi-cylindrical casing having its concavity facing downwardly and disposed transversely of the line of travel, a framework to which said casing is secured, a rotating chopping and gathering structure journalled in said casing and substantially coaxial thereof for chopping and gathering standing crops, and including a plurality of radially positioned hammers, an upper discharge chute communicating directly through an upper portion of said casing, the lower end of said chute being substantially co-extensive with said casing, said chute including a plurality of laterally spaced baffle members therein for uniformly discharging material betwen said baffle members, said baffle members being positioned substantially vertically and generally following the contour of the wall of said casing, said baffle members extending upwardly into said chute and along a wall thereof, the direction of rotation of the ends of said radially positioned hammers being such that when chopping said crops approximately at ground level or thereabove, said ends will travel in the same direction as that in which said machine is traveling, whereby said chopped crop will be impelled directly from said hammers upwardly between said baffles and into said chute.

References Cited in the file of this patent

UNITED STATES PATENTS

| | | |
|---|---|---|
| 2,262,453 | Dray | Nov. 11, 1941 |
| 2,517,184 | Elliott et al. | Aug. 1, 1950 |
| 2,634,570 | Brockman et al. | Apr. 14, 1953 |
| 2,786,317 | Lundell | Mar. 26, 1957 |

OTHER REFERENCES

Agricultural Engineering, vol. 36, No. 7, pages 453–457.